(12) United States Patent
Yanagawa et al.

(10) Patent No.: US 7,317,813 B2
(45) Date of Patent: Jan. 8, 2008

(54) VEHICLE VICINITY IMAGE-PROCESSING APPARATUS AND RECORDING MEDIUM

(75) Inventors: Hirohiko Yanagawa, Chiryu (JP); Tetsuri Ishikawa, Anjo (JP); Masayuki Imanishi, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 733 days.

(21) Appl. No.: 10/333,745

(22) PCT Filed: Mar. 15, 2002

(86) PCT No.: PCT/JP02/02525

§ 371 (c)(1),
(2), (4) Date: Jan. 29, 2003

(87) PCT Pub. No.: WO02/104032

PCT Pub. Date: Dec. 27, 2002

(65) Prior Publication Data

US 2003/0165255 A1 Sep. 4, 2003

(30) Foreign Application Priority Data

Jun. 13, 2001 (JP) .............................. 2001-178776

(51) Int. Cl.
G06K 9/36 (2006.01)
H04N 9/47 (2006.01)
H04N 7/18 (2006.01)
B60Q 1/00 (2006.01)

(52) U.S. Cl. ...................... 382/104; 382/284; 348/115; 348/148; 340/435; 340/937; 701/28

(58) Field of Classification Search ................ 382/104, 382/284; 348/113, 115, 118, 148; 340/426.22, 340/426.23, 426.33, 435–437, 901, 937; 701/28

See application file for complete search history.

(56) References Cited

U.S. PATENT DOCUMENTS 5,670,935 A * 9/1997 Schofield et al. ........... 340/461

(Continued)

FOREIGN PATENT DOCUMENTS

EP 1115250 A1 * 7/2001

(Continued)

OTHER PUBLICATIONS

Machine translation of JP-A-2001-114047.*

(Continued)

*Primary Examiner*—Matthew C. Bella
*Assistant Examiner*—Anthony Mackowey
(74) *Attorney, Agent, or Firm*—Posz Law Group, PLC

(57) ABSTRACT

The present invention provides a vehicle vicinity image-processing apparatus and a recording medium capable of deducing a scene having left the field of vision of a camera mounted on the rear of a vehicle and drawing an image of the area behind the vehicle which includes this deduced part. An image-processing unit 5 first coordinate-converts a picked-up image to create a bird's-eye view image. Two chronologically consecutive bird's-eye view images are created as the bird's-eye view image, and a matching area of the two images is extracted. On the basis of this matching area, a moved area which has left the present field of vision of the camera 1 is extracted. An image of the matching area and the moved area is then drawn on a monitor 3. By this means, it is possible to draw an image including a scene which has left the present field of vision of the camera 1.

9 Claims, 9 Drawing Sheets

U.S. PATENT DOCUMENTS

| | | | |
|---|---|---|---|
| 5,790,403 A * | 8/1998 | Nakayama | 701/28 |
| 6,344,805 B1 | 2/2002 | Yasui et al. | |
| 6,515,597 B1 * | 2/2003 | Wada et al. | 340/988 |
| 6,539,288 B2 * | 3/2003 | Ishida et al. | 701/1 |
| 6,734,896 B2 * | 5/2004 | Nobori et al. | 348/148 |
| 6,785,403 B1 | 8/2004 | Murakami et al. | |
| 7,161,616 B1 * | 1/2007 | Okamoto et al. | 348/148 |

FOREIGN PATENT DOCUMENTS

| | | | |
|---|---|---|---|
| EP | 1265195 A2 * | 12/2002 | |
| JP | A-H3-099952 | 4/1991 | |
| JP | A-8-48198 | 2/1996 | |
| JP | 09193710 A * | 7/1997 | |
| JP | A-H10-175482 | 6/1998 | |
| JP | A-10-211849 | 8/1998 | |
| JP | A-2001-088609 | 4/2001 | |
| JP | A-2001-114047 | 4/2001 | |

OTHER PUBLICATIONS

Machine translation and DERWENT abstract of JP 09193710 A to Sekine et al.*

Notice of Reasons for Refusal from Japanese Patent Office issued on May 14, 2006 for the corresponding Japanese patent application No. 2001-204024 (a copy and English translation thereof).

Notice of Reasons for Refusal from Japanese Patent Office issued on Jul. 4, 2006 for the corresponding Japanese patent application No. 2001-178776 (a copy and English translation thereof).

Decision of Refusal issued on Dec. 19, 2006 in corresponding JP application JP-A-2001-178776 (original and English translation).

* cited by examiner

IMAGE A

IMAGE B

COMPOSITE IMAGE

IMAGE A

| 7 | 7 | 7 | 7 |
|---|---|---|---|
| 3 | 3 | 3 | 3 |
| 1 | 1 | 1 | 1 |
| 2 | 2 | 2 | 2 |

IMAGE B

| 3 | 3 | 3 | 3 |
|---|---|---|---|
| 1 | 1 | 1 | 1 |
| 2 | 2 | 2 | 2 |
| 8 | 8 | 8 | 8 |

SECOND BIRD'S-EYE VIEW IMAGE

MOVED BIRD'S-EYE VIEW IMAGE

WITHIN FIRST CAMERA VIEW FIELD

OUTSIDE CAMERA VIEW FIELD

NON-DISPLAY AREA

NON-DISPLAY AREA

VEHICLE VICINITY IMAGE-PROCESSING APPARATUS AND RECORDING MEDIUM

TECHNICAL FIELD

This invention relates to a vehicle vicinity image-processing apparatus and a recording medium for picking up and displaying on a monitor an image of for example the area behind a vehicle.

BACKGROUND ART

As an apparatus for displaying the scene behind a vehicle, a display apparatus which outputs unchanged to a monitor an image from a camera mounted on the rear of the vehicle has been known. According to the display apparatus, although the situation behind the vehicle can be understood to some extent, there has been the problem that it is difficult to understand the relative positions of the vehicle and objects (for example the marking of a parking space) in the image displayed on the monitor.

Separately from such a display apparatus, in Japanese Unexamined Patent Publication No. H.10-211849, technology which converts an image picked up by a rear camera (a rear camera image) into a bird's-eye view image and displays in this bird's-eye view image the vehicle on which the rear camera mounted is proposed. In the case of this technology, because the vehicle is shown in the bird's-eye view image, the positional relationship between objects displayed in the image and the vehicle is easier to understand than with the display apparatus which simply displays the picked-up image on the monitor as it is; however, there has been another problem that objects outside the present field of vision of the camera cannot be displayed.

Consequently, when for example the vehicle is being reversed into a parking space, because the marking of the parking space which have left the field of vision of the camera cannot be displayed, as before, there is the problem that maneuvering of backing the vehicle into the parking space is not easy.

It is therefore a first object of the present invention to provide a vehicle vicinity image-processing apparatus and a recording medium capable of deducing and drawing a part of a scene having left the field of vision of for example a camera. It is a second object of the invention to provide a vehicle vicinity image-processing apparatus and a recording medium with which it is possible to deduce and draw a part of a scene having left the field of vision of for example a camera and also it is possible to lighten the computational processing load involved in so doing.

DISCLOSURE OF THE INVENTION

To achieve the above-mentioned first object, according to a first aspect of the invention, in a vehicle vicinity image-processing apparatus which, in a vehicle having image pick-up means (for example a camera) for picking up an image of the vehicle vicinity and display means (for example a monitor) for displaying the image, processes the image picked up by the image pick-up means and displays it on the display means, the image picked up by the image pick-up means is converted into data of a ground surface coordinate system projected with the image pick-up means as a view point to create a bird's-eye view image. As a result, the image is not a distorted image as it is picked up by for example a camera, but becomes an easily understood bird's-eye view image such as is seen from the sky above the ground surface. Next, a first bird's-eye view image generated like this and a second bird's-eye view image generated after that are compared to distinguish a matching area and a non-matching area thereof. The non-matching area obtained by this distinguishing is added to the second bird's-eye view image to make a composite image, and this composite image is processed so that it can be displayed on the display means and is displayed on the display means.

That is, as the vehicle moves, because the field of vision of the for example camera changes, naturally, in the first bird's-eye view image and the second bird's-eye view image (which were picked up at different times), a non-matching area, which is a difference between the images (a part which is displayed in the first bird's-eye view image but does not appear in the second bird's-eye view image), arises.

In this aspect of the invention, the difference of image between the first bird's-eye view image and the second bird's-eye view image is detected, and an image of this difference part (a part which was displayed before) is added to the second bird's-eye view image, whereby the situation around the vehicle can be understood more clearly. In this way, in this aspect of the invention, because an area having left the present field of vision of the for example camera can be displayed, there is the effect that for example when backing into a parking space, the maneuvering of the vehicle becomes extremely easy.

The image picked up by the image pick-up means can for example be an image of an area behind a vehicle picked up by a camera mounted on the rear of the vehicle. In this case, for example when the vehicle is backing into a parking space, because the positional relationship between the marking of the parking space and the vehicle can be well understood, there is the effect that parking can be carried out easily. When areas at the sides of the vehicle can also be picked up by the image pick-up means, because when moving sideward in reverse the situation at the sides can be well understood, sideward movement can be carried out easily. Also, besides the area behind the vehicle, another example of an image that may be picked up by the image pick-up means is the area in front of the vehicle. In this case, when images of areas at the sides of the vehicle can also be picked up, because when moving sideward while moving forward the situation at the sides can be well understood, sideward movement can be carried out easily.

Bird's-eye view image generating means may extract an image showing a lane marking (of for example a parking space) in generating the bird's-eye view image. That is, when the bird's-eye view image is generated, although the whole of the picked-up image may be converted into a bird's-eye view image, alternatively just a lane marking (shown by for example white lines) maybe extracted, for example by binarization processing, and displayed. In this case, because only the lane marking needs to be processed, there is the effect that the image-processing load is lightened. When for example the vehicle is driven into a parking space bounded by the lane marking, only the position of the parking space needs to be recognized, and because when there are other things in the image these actually make the image less clear, there is the merit that extracting only the lane marking makes maneuvering of the vehicle easier.

The first bird's-eye view image and the second bird's-eye view image may be chronologically consecutive bird's-eye view images. In this case, because the difference between the first bird's-eye view image and the second bird's-eye view image is slight, detection of the matching area and the non-matching area is easy. This is desirable also when the non-matching area is being added to the second bird's-eye view image, as it ensures that there is no incongruity at the join between the images.

Preferably, display processing means performs coordinate conversion for displaying image data of the composite image on the display means. That is, to display the bird's-eye view image on for example a monitor, because adjustment of its size and so on is necessary, necessary processing should be performed so that it can be displayed optimally on the monitor.

The composite image can be compared with a third bird's-eye view image picked up and generated after that and a non-matching area distinguished, and this non-matching area added to the composite image to make a new composite image. By suitably adding a moved bird's-eye view image in this way it is possible to synthesize images continuously and thereby make it possible to understand the situation around the vehicle more clearly.

To achieve the second object of the invention mentioned above, according to a second aspect of the invention, in a vehicle vicinity image-processing apparatus which, in a vehicle having image pick-up means (for example a camera) for picking up an image of the vehicle vicinity and display means (for example a monitor) for displaying the image, processes the image picked up by the image pick-up means and displays it on the display means, the image picked up by the image pick-up means is converted into data of a ground surface coordinate system projected for example with the image pick-up means as a view point, to create image data of bird's-eye view images successively. That is, image data of a first bird's-eye view image and a second bird's-eye view image, which is a later image, are generated. As a result, the image is not a distorted image as it is picked up for example by a camera, but becomes an easily understood bird's-eye view image such as is seen from the sky above the ground surface.

Also, in this aspect of the invention, an amount of movement of the vehicle (movement amount) is detected on the basis of vehicle signals (for example a vehicle speed signal and a yaw rate signal) obtained from the vehicle. Because this detected amount of vehicle movement corresponds to an amount by which the first bird's-eye view image has moved, the first bird's-eye view image is moved in correspondence with the amount of vehicle movement to create image data of a moved bird's-eye view image.

Then, image data of a new second bird's-eye view image (newer than the first bird's-eye view image) is combined with image data of the moved bird's-eye view image to create image data of a composite bird's-eye view image to be displayed on the display means. That is, as the vehicle moves, because the field of vision of (for example) the camera changes, naturally, between the first bird's-eye view image and the second bird's-eye view image, a difference in the images (a difference in the part picked up) arises. Accordingly, in this aspect of the invention, by suitably adding to the second bird's-eye view image the moved bird's-eye view image corresponding to this difference part (that is, a part which was in the field of vision before but is not in the present field of vision), a part which has left the field of vision of the camera can be displayed on the monitor, whereby the situation around the vehicle can be understood more clearly. In this way, in this aspect of the invention, because an area having left the present field of vision of (for example) the camera can be displayed, there is the effect that for example when the vehicle is being parked in reverse, this maneuvering becomes extremely easy.

In particular, in this aspect of the invention, because the moved bird's-eye view image is not created by calculating the movement of the vehicle from changes of image with time, but rather the moved bird's-eye view image is created using the vehicle signals, there is the merit that the computation for the image-processing can be simplified. Consequently, because the load on the microcomputer or the like is lightened, the processing speed of the apparatus as a whole can be improved. And because the processing can be carried out by a microcomputer having a lower processing capacity, a contribution to cost reduction is also made.

The composite bird's-eye view image can be an image in which a moved bird's-eye view image is added to the display area displayed by the second bird's-eye view image. This is one example of a method for forming the composite bird's-eye view image, and by this method it is possible to display an image of the surroundings of the vehicle continuously. That is, because as mentioned above the image presently being picked up by for example the camera can be displayed on the monitor as the second bird's-eye view image, by adding an earlier image which is going to disappear from the monitor as a moved bird's-eye view image to the area where the second bird's-eye view image is displayed, it is possible to display on the monitor also the situation of a past area of the surroundings which has left the field of vision of the camera.

As the second bird's-eye view image used in the composite bird's-eye view image, the latest bird's-eye view image can be used. When the latest bird's-eye view image newly picked up by the camera or the like is used as the second bird's-eye view image, the situation of the surroundings of the vehicle can be understood more certainly.

A bird's-eye view image made by bird's-eye view image generating means maybe stored in an image memory A and a composite bird's-eye view image composed by composite bird's-eye view image composing means stored in an image memory B. This is an example of memories for storing the different bird's-eye view images. And preferably, the composite bird's-eye view image stored in the image memory B is displayed on the display means. In this way, it is possible to display the composite bird's-eye view image on a monitor or the like.

In the first and second aspects of the invention described above, when the composite image is displayed on the display means, an image of the vehicle maybe added to it. When the composite image showing the situation of the surroundings of the vehicle is displayed with an image showing the vehicle added to it like this, because the positional relationship between the vehicle and for example a parking space marking becomes clear, maneuvering of the vehicle becomes easy. Because for example the camera is fixed in a predetermined position on the vehicle, the position of the vehicle on the screen of for example the monitor is always the same. Therefore, the vehicle can be shown in a fixed position on the screen of the monitor, and the vehicle may even be represented on the screen of the monitor by printing or the like in advance. And, because the field of vision angle of the camera is also normally constant, not only the vehicle but also the field of vision angle of the camera (its left-right range) may be displayed on the screen of the monitor.

Means for executing the processing of a vehicle vicinity image-processing apparatus described above can be stored as a program on a recording medium. This recording medium may be any of various recording media, and may for example be an electronic control unit constructed as a microcomputer; a microchip; a floppy disk; a hard disk; or an optical disk.

BEST MODE FOR CARRYING OUT THE INVENTION

Embodiments of a vehicle vicinity image-processing apparatus and recording medium according to the present invention will now be described.

First Embodiment

The basic system configuration of this embodiment will be explained using FIG. 1 and FIG. 2.

Figure 1:
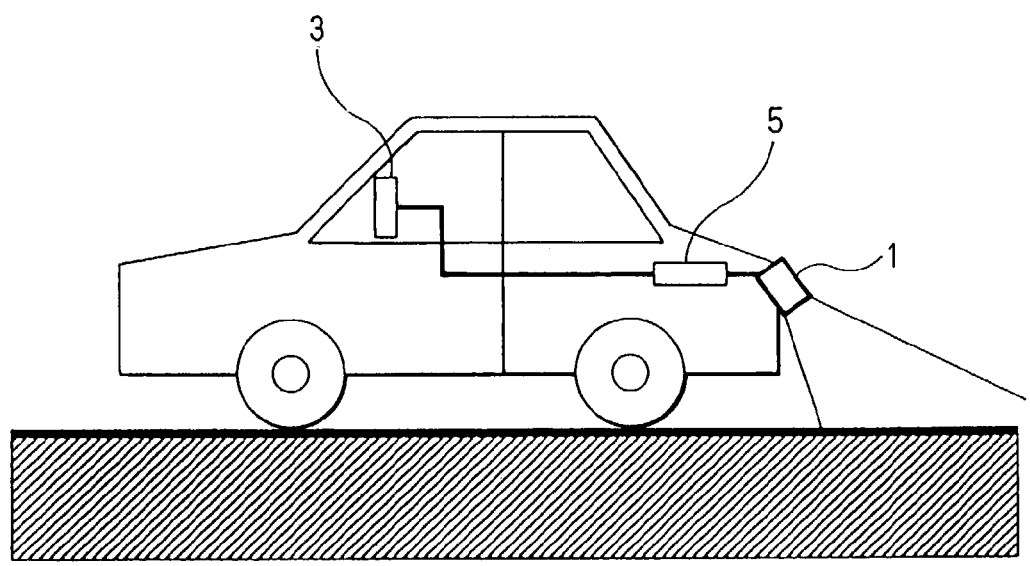
FIG. 1 is a schematic view showing the main parts of a vehicle vicinity image-processing apparatus according to a first embodiment

As shown in FIG. 1, the vehicle vicinity image-processing apparatus of this embodiment has a camera (for example a CCD camera) 1 mounted on the rear of an automobile, an in-vehicle monitor (for example a liquid crystal display) 3 mounted on a dashboard, and an image-processing unit 5 for carrying out image-processing.

Figure 2:
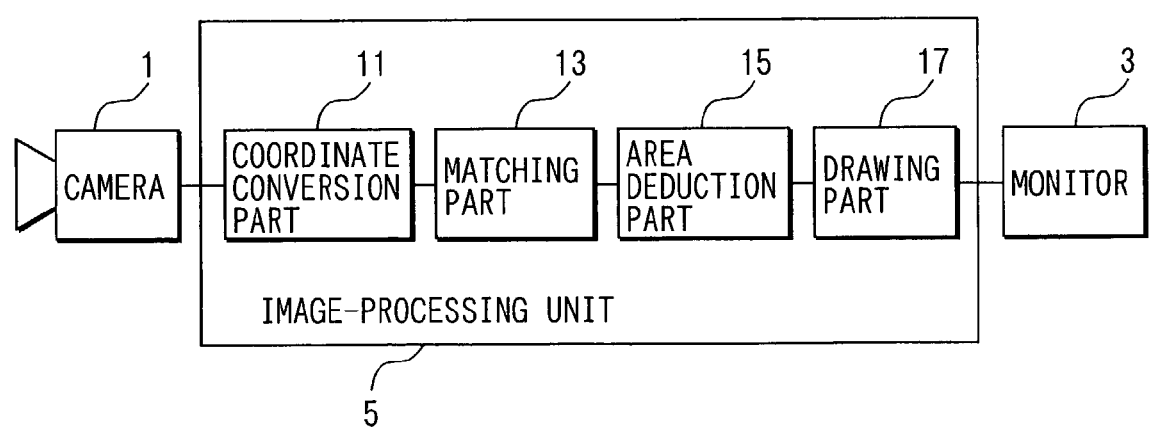
FIG. 2 is a block diagram showing the electronic constitution of the vehicle vicinity image-processing apparatus of the first embodiment.

As shown in FIG. 2, the image-processing unit 5 is an electronic device, having a microcomputer as a main part, for carrying out processing of image data, and, functionally, it has a coordinate conversion part 11 for performing a coordinate conversion on image data picked up by the camera 1 to create a bird's-eye view image; a matching part 13 for taking in two chronologically consecutive bird's-eye view images and comparing them; an area deduction part 15 for deducing an area having left the field of vision of the camera 1 from a non-matching part of the two bird's-eye view images; and a drawing part 17 for drawing an image to be displayed on the monitor 3. The image-processing unit 5 may be constructed integrally with the camera 1.

An image processing procedure of this embodiment will now be described, on the basis of FIG. 3A through FIG. 5C. Here, the case of reversing (backing) a vehicle into a parking space will be used as an example.

Figure 3A:
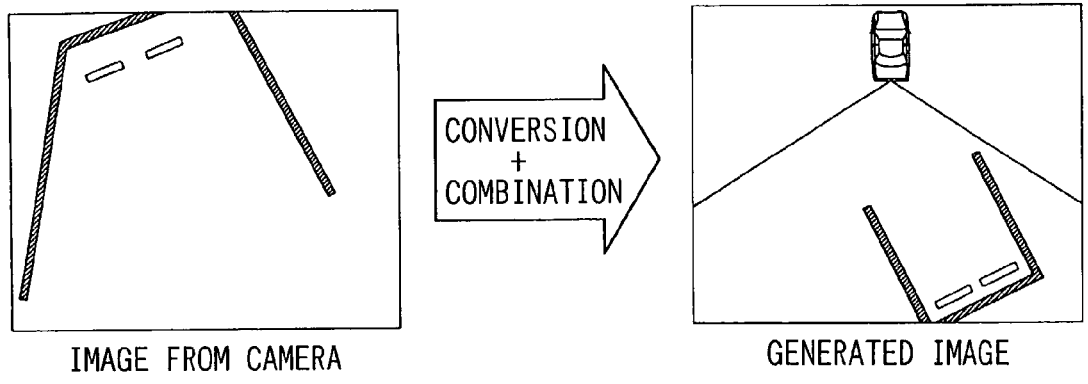
FIGS. 3A through 3C are views illustrating a processing procedure carried out by the vehicle vicinity image-processing apparatus of the first embodiment.

An image outputted from the camera 1 (the output image) is shown in the left side of FIG. 3A. This image is an image of the marking of a parking space drawn on the ground, and the vicinity of the parking space, picked up by the camera 1; and because the camera 1 is mounted on the top of the rear of the vehicle, the actually rectangular parking space marking is displayed distorted in correspondence with the distances and soon between the vehicle (and hence the camera 1) and the positions of the lines of the parking space marking.

Next, as will be discussed in more detail later, the image on the left side of FIG. 3A is coordinate-converted to create a bird's-eye view image, and then to this bird's-eye view image is added an image showing the position of the vehicle and the field of vision angle of the camera 1 to generate a composite image, and this composite image is displayed on the screen of the monitor 3 as shown on the right side of FIG. 3A. That is, because the height at which the camera 1 is mounted and its mounting angle and field of vision angle are known, the output image of the camera 1 can be coordinate-converted by the coordinate conversion part 11 (using known bird's-eye view conversion) to obtain a bird's-eye view image like that shown in the right side of FIG. 3A.

Figure 4:
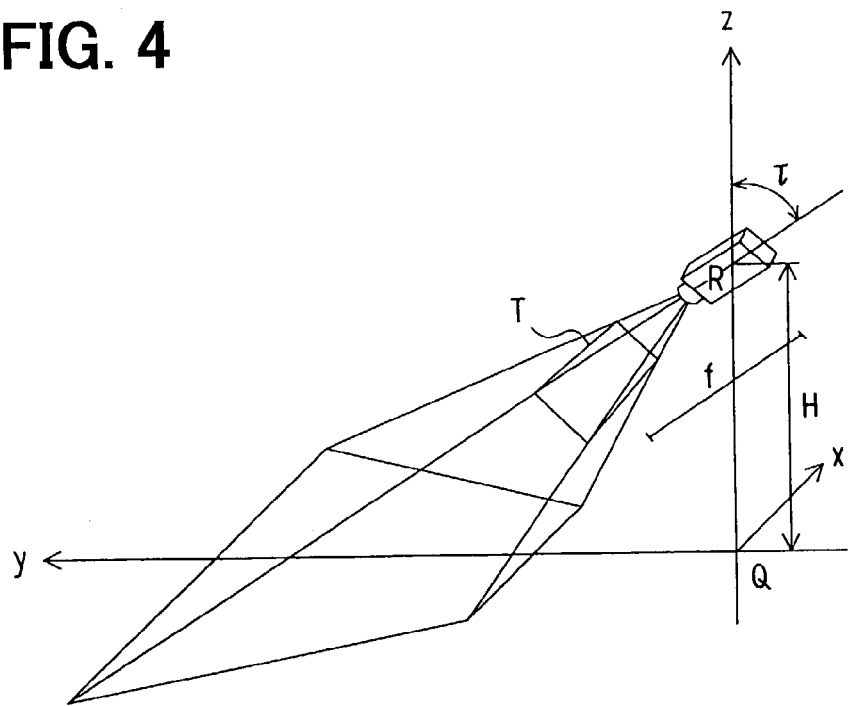
FIG. 4 is a view illustrating positional relationship in a coordinate conversion carried out by the vehicle vicinity image-processing apparatus of the first embodiment.

For this processing for converting the image picked up by the camera 1 into a bird's-eye view image and displaying it on the monitor 3, related art technology can be used (for example Japanese Unexamined Patent Publication No. H. 10-211849), as will be explained hereinafter. Here, by carrying out reverse processing of ordinary perspective conversion, the position of an image (for example a parking space marking) on a ground surface is obtained as a bird's-eye view image. In more detail, as shown in FIG. 4, perspective conversion is executed in such a manner that position data of an image on the ground is projected onto a screen plane T which has a focus distance f from the camera position R.

Specifically, it is assumed that the camera 1 is positioned at a point R (0, 0, H) on a Z-axis, monitoring an image on a ground plane (x-y coordinate plane) at a look-down angle τ. And accordingly, here, as shown by the formula below (1), two-dimensional coordinates (α, β) on the screen plane T can be converted into coordinates on the ground plane (bird's-eye view coordinates) (reverse perspective conversion).

$$\begin{bmatrix} x \\ y \end{bmatrix} = \begin{bmatrix} H \cdot \alpha / (-\beta \cos\tau + f \sin\tau) \\ H \cdot (\beta \sin\tau + f \cos\tau) / (-\beta \cos\tau + f \sin\tau) \end{bmatrix} \quad (1)$$

That is, by using the above formula (1) it is possible to convert projected image data into image data for the screen of the monitor 3 (which shows a bird's-eye view image) and display it on the monitor 3.

Figure 3B:
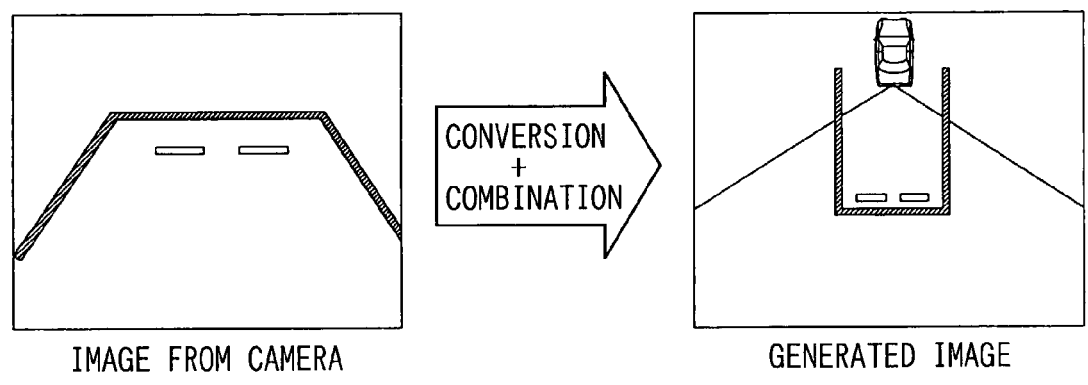

Next, when the vehicle backs into the parking space, as shown in the left side of FIG. 3B and the left side of FIG.

3C, the part of the parking space marking near the vehicle progressively leaves the field of vision of the camera 1; and at this time, the matching part 13 takes in two chronologically consecutive bird's-eye view images and compares them.

Figure 5A:
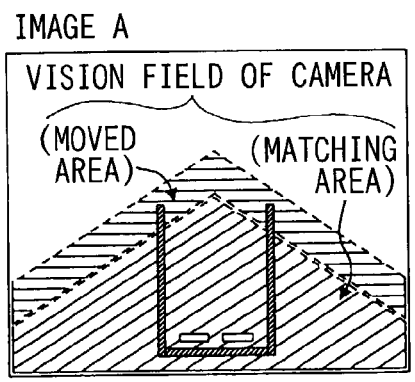
FIGS. 5A through 5C are views illustrating a processing procedure carried out by the vehicle vicinity image-processing apparatus of the first embodiment.
Figure 5B:
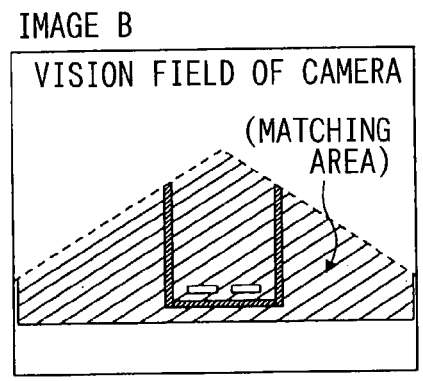
Figure 5C:
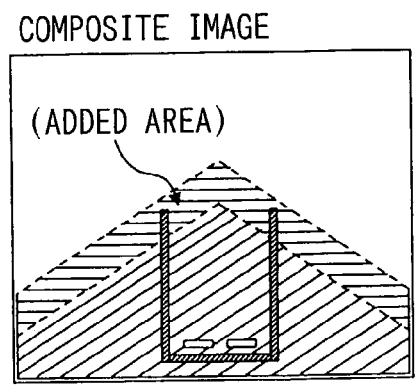

Examples of consecutive bird's-eye view images (an image A changing to an image B) are shown in FIGS. 5A and 5B. As will be further discussed later, an area which matches completely in the two images (the matching area) can be extracted by comparing the image A and the image B. In the image B, because the vehicle is closer to the parking space marking than in the case of the image A, a part of the parking space marking is cut off. Consequently, the area deduction part 15 deduces that, of the areas of the images which do not match (the non-matching areas), the V-shaped area near the camera 1 is an area where the image has moved (moved area) due to movement of the vehicle. And by combining the moved area of the image A with the image B, as shown in FIG. 5C, it is possible to make a composite image in which a part of the parking space marking outside the field of vision of the camera 1 (the moved area) is also displayed.

Although a method in which the matching area of the image A and the image B are extracted will be described here in after, various known methods can be employed for this image-processing. For example, predetermined areas (for comparing) of the images A and B can be divided into multiple small areas (pixels), as shown in FIGS. 6A and 6B; the pixels of the images A and B which match to the highest degree detected; and the positional relationship between the image A and the image B (i.e. how far the image A has moved) then obtained from the positional relationship of the matching pixels.

Figures 6A, 6B, 7:
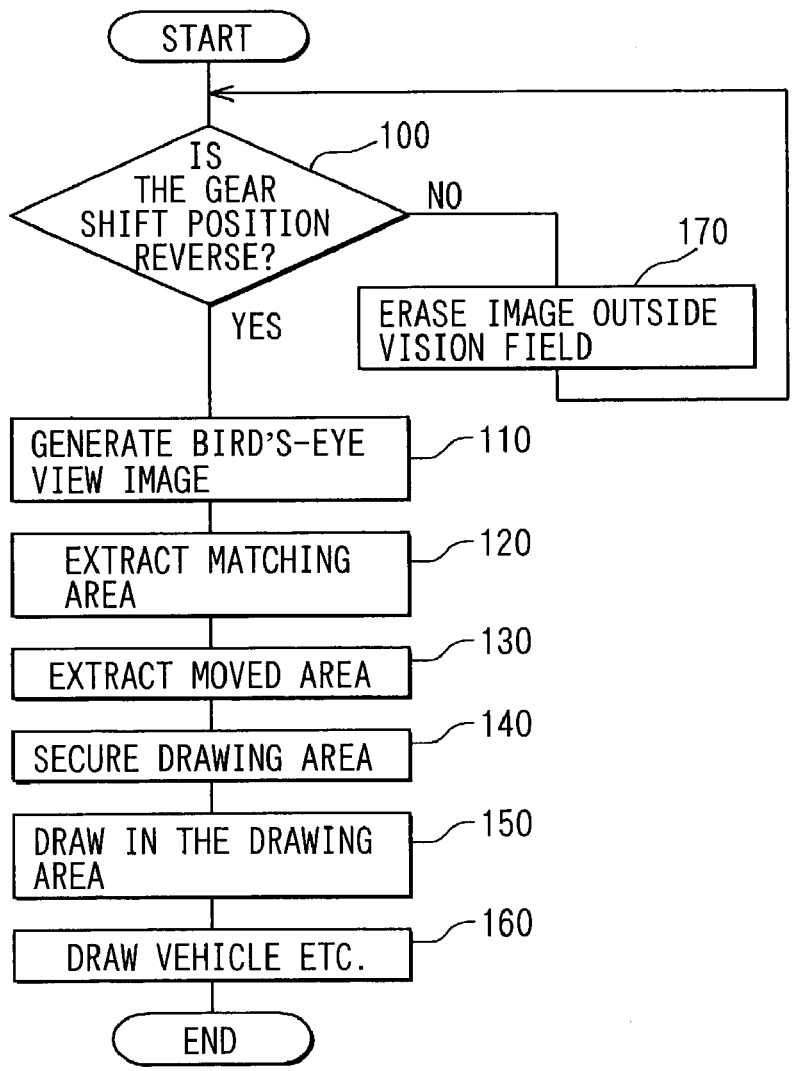
FIGS. 6A and 6B are views illustrating a procedure used for obtaining an amount by which an image has moved in the vehicle vicinity image-processing apparatus of the first embodiment.
FIG. 7 is a flow chart of processing carried out by the vehicle vicinity image-processing apparatus of the first embodiment.

Specifically, as shown in FIGS. 6A and 6B, considering the case where for example the brightness level of the figure (or alternatively the color) in each pixel is expressed with a number, here, the brightnesses of the bottom three rows of pixels in the image A and the brightnesses of the top three rows of pixels in the image B match. Accordingly, in this case, it can be supposed that the image A matches the image B by moving through the width of one row of pixels in the vertical direction of the drawing. In this case, it appears that the figure in the image B has moved upward as a result of the vehicle moving downward in FIGS. 6A and 6B.

That is, when the image A and the image B are compared, both the images are divided into small areas, and when the images match in most of these small areas (when the degree of matching is high), the matching parts are regarded as the same image. Accordingly, when in the image A and the image B the matching parts are shifted, it can be inferred that they have become different due to the image having moved, and the amount and the direction of that movement can also be obtained. Similarly, amounts of movement in the left-right direction and diagonal directions can also be obtained.

Figure 3C:
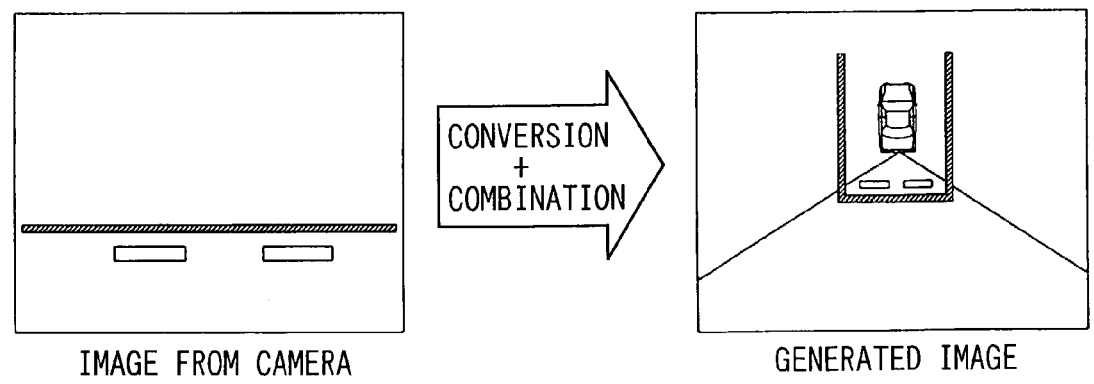

When this composite image is displayed on the monitor 3, as shown in the right side of FIG. 3B and the right side of FIG. 3C, the drawing part 17 draws the composite image and also draws an image showing the position of the vehicle and the field of vision angle of the camera 1. In this case, because the camera 1 is fixed to the vehicle in an unchanging position, the image of the vehicle and the field of vision angle of the camera 1 can be displayed in the same position on the screen of the monitor 3 at all times (for example the upper part of the center of the display screen).

Processing carried out by the image-processing unit 5 and so on will now be described, on the basis of the flow chart of FIG. 7.

As shown in FIG. 7, first, in step 100, it is determined whether or not the gear shift position is Reverse. When an affirmative determination is made here processing proceeds to step 110, and when a negative determination is made processing proceeds to step 170. The shift position can be detected on the basis of a signal from a shift position detection sensor (not shown) or a signal from another electronic control unit.

In step 170, the image of an area outside the field of vision of the camera drawn previously is erased; that is, only the present camera image (bird's-eye view image) is displayed, and processing returns to step 100.

In step 110, on the other hand, coordinate conversion (the above-mentioned bird's-eye view conversion) of the image picked up by the camera 1 is carried out, and a bird's-eye view image is obtained. In the following step 120, a matching area of two consecutive bird's-eye view images is extracted. For example from the image A and the image B in FIGS. 5A and 5B, the matching area is extracted. And in the following step 130, a moved area outside the present field of vision of the camera 1 is extracted.

In step 140, whereas the moved area of the image A is later to be drawn outside the field of vision of the camera in the image B, before it is drawn, the image B already drawn is shifted by an amount corresponding to the moved area (downward in the image B), whereby a drawing area is secured.

In the following step 150, as shown for example in FIG. 5C, the moved area is drawn in the drawing area secured in the foregoing step 140 (a composite image is composed). And in the following step 160, as shown for example in the right side of FIG. 3C, the vehicle and a V-shaped line showing the field of vision angle are drawn, and the present processing ends.

Preferably, when a composite image has already been composed and stored, this composite image and the latest bird's-eye view image are compared and a non-matching area thereof is identified, and this non-matching area is added to the stored composite image to make a new composite image. In this way it is possible to synthesize images continuously by suitably adding each post-movement bird's-eye view image to the composite image, and as a result it is possible to understand the situation around the vehicle more clearly.

Thus, in this embodiment, an image picked up by a camera is converted to a bird's-eye view image; a matching area of chronologically consecutive bird's-eye view images is extracted; and a moved area, which is a differing part of the two bird's-eye view images, is extracted. Then, the moved area is added to the bird's-eye view image showing the present image to make a composite image, and when the composite image is displayed on the screen of the monitor 3, an image of the vehicle and the field of vision angle of the camera are added. That is, in this embodiment, when the vehicle moves, an area having left the field of vision of the camera is deduced and combined with the present camera image, whereby it is possible to display the area which is outside the field of vision of the camera and ordinarily could not be displayed; and consequently, it is possible to understand the positional relationship between the vehicle and the parking space clearly. As a result, there is the valuable effect that maneuvering such as reversing into a parking space becomes extremely easy.

Second Embodiment

A second embodiment of the invention will now be described, although parts the same as parts in the first embodiment will not be explained again here. In this embodiment, only image of a parking space marking and car stoppers and the like is extracted and drawn, and the image of the background is dispensed with.

Figure 8:
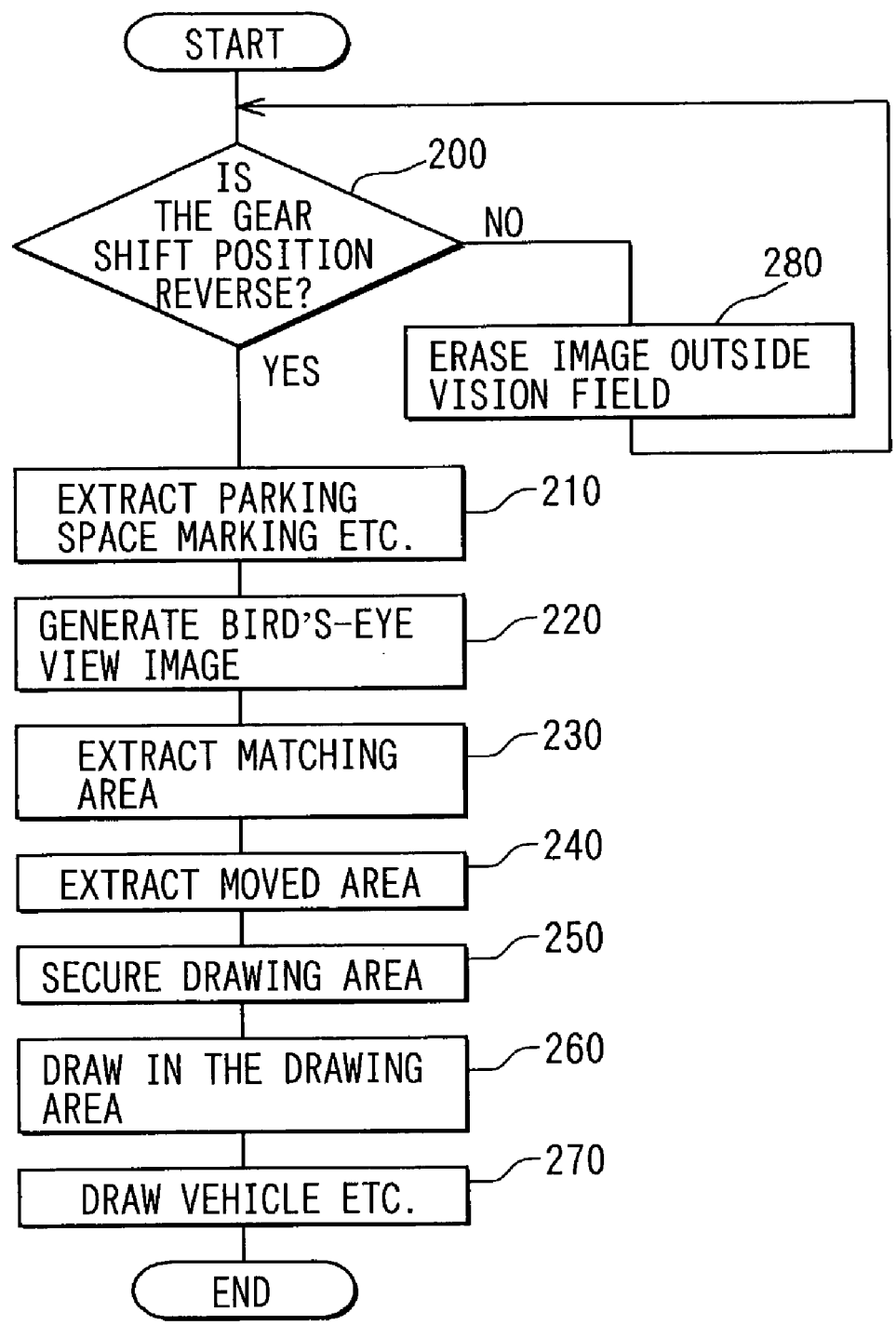
FIG. 8 is a flow chart of processing carried out by a vehicle vicinity image-processing apparatus of a second embodiment.

As shown in the flowchart of FIG. 8, first, in step 200, it is determined whether or not the gear shift position is Reverse. When an affirmative determination is made here processing proceeds to step 210, and when a negative determination is made processing proceeds to step 280.

In step 280, a previously drawn image of an area outside the field of vision of the camera is erased. In step 210, on the other hand, an image of the parking space marking and car stoppers and the like is extracted by means of binarization processing from the image picked up by the camera. Here, it is assumed that the parking space marking and the car stoppers are painted in white and are easily distinguishable from a ground surface of black asphalt.

In the following step 220, the binarized image is subjected to bird's-eye view conversion to create a bird's-eye view image of the parking space marking and the car stoppers. Here, the background is of a single color. Then in step 230, a matching area of two consecutive bird's-eye view images is extracted. And in step 240, a moved area having left the present field of vision of the camera 1 is extracted.

In the following step 250, before an image of the moved area is drawn, the image B already drawn is shifted (downward in the image B) by the amount of the moved area to secure a drawing area. Then in step 260, an image of the moved area is drawn in the drawing area secured in step 250 (a composite image is composed). Instep 270, the vehicle and a V-shaped line showing the field of vision angle of the camera are drawn, and the processing routine ends.

In this embodiment also, the same benefits as those of the first embodiment are obtained; moreover, in this embodiment, the entire picked-up image is not converted to a bird's-eye view image and displayed, but rather just things necessary for parking, for example only the parking space marking and car stoppers, besides the vehicle and the field of vision angle, are displayed. As a result, the image processing load is lightened; the image displayed on the monitor 3 becomes easy to watch; and there is the merit that maneuvering of the vehicle becomes easy.

Third Embodiment

A third embodiment will now be described. First, the basic system configuration of this embodiment will be explained, using FIG. 9 and FIG. 10.

Figure 9:
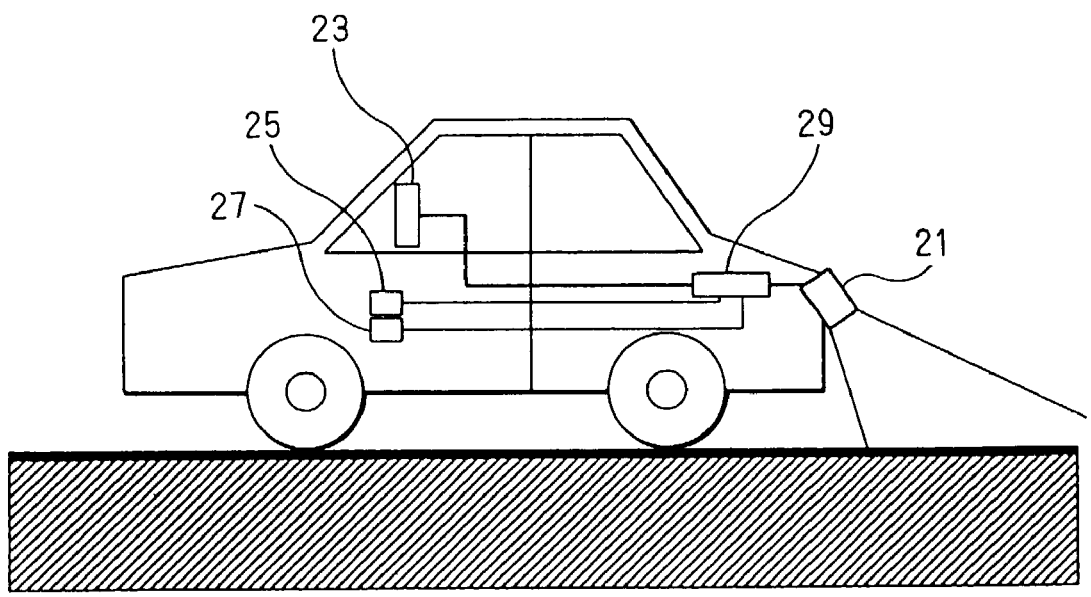
FIG. 9 is a schematic view showing the main parts of a vehicle vicinity image-processing apparatus according to a third embodiment

As shown in FIG. 9, the vehicle vicinity image-processing apparatus of this embodiment has a camera (for example a CCD camera) 21 mounted on the rear of the vehicle; an in-vehicle monitor (for example a liquid crystal display) 23 mounted on the dashboard of the vehicle; a vehicle speed sensor 25 for detecting a vehicle speed; a yaw rate sensor 27 for detecting a yaw rate; and an image-processing unit 29 for carrying out image-processing.

Figure 10:
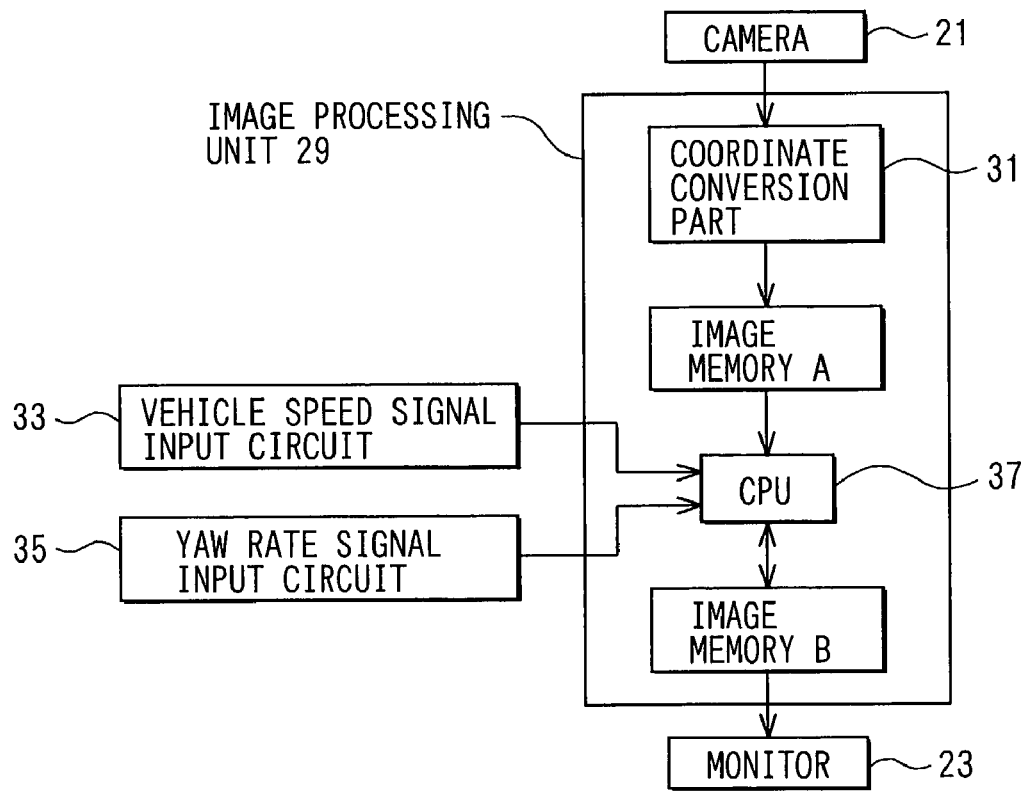
FIG. 10 is a view showing the electronic constitution of the vehicle vicinity image-processing apparatus of the third embodiment.

The image-processing unit 29, as shown in FIG. 10, is an electronic device, having a microcomputer as a main part, for carrying out processing of image data, and has a coordinate conversion part (bird's-eye view image conversion circuit) 31 for performing coordinate conversion of image data picked up by the camera 21; an image memory A for temporarily storing image data of a created bird's-eye view image; a vehicle speed signal input circuit 33 for inputting a vehicle speed signal; a yaw rate signal input circuit 35 for inputting a yaw rate signal; a CPU 37 for reading in the vehicle speed signal and the yaw rate signal and carrying out computation such as that for moving the bird's-eye view image (for example turning it); and an image memory B for storing data of a bird's-eye view image to be displayed on the monitor 23.

Here, as will be further discussed later, the image data of a bird's-eye view image stored in the image memory B is image data of a bird's-eye view image (composite bird's-eye view image) made by combining an image (moved bird's-eye view image) obtained by moving a bird's-eye view image (first bird's-eye view image) created on the basis of image data picked up by the camera 21 at the previous time (for example at a time T) with a bird's-eye view image (second bird's-eye view image) created on the basis of image data picked up by the camera 21 newly (for example at a time T+1) The image-processing unit 29 may be constructed integrally with the camera 21, and the constituent parts of the image-processing unit 29 may be partially or entirely integrated by an LSI.

Figure 11A:
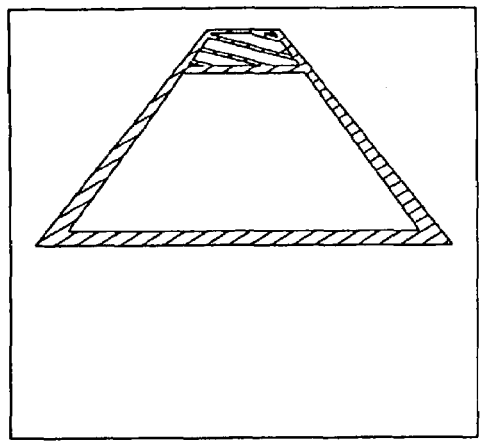
FIGS. 11A and 11B are views showing images used by the vehicle vicinity image-processing apparatus of the third embodiment, FIG. 11A showing an image picked up by a camera and FIG. 11B showing a bird's-eye view image.

A procedure of image processing in this embodiment will now be described, on the basis of FIGS. 11A and 11B and FIG. 12. The case of reversing (backing) a vehicle into a parking space will be used as an example.

First, a procedure by which an image inputted from the camera 21 is converted into a bird's-eye view image and stored in the image memory A will be explained. An unprocessed image (output image) outputted from the camera 21 is shown in FIG. 11A. Because this unprocessed image is an image of the marking of a parking space drawn on the ground and the vicinity thereof, picked up by the camera 21 mounted on the top of the rear of the vehicle, the actually rectangular parking space marking are displayed distorted in correspondence with the distances and so on between the vehicle (and hence the camera 21) and the positions of each line of the parking space marking.

Figure 11B:
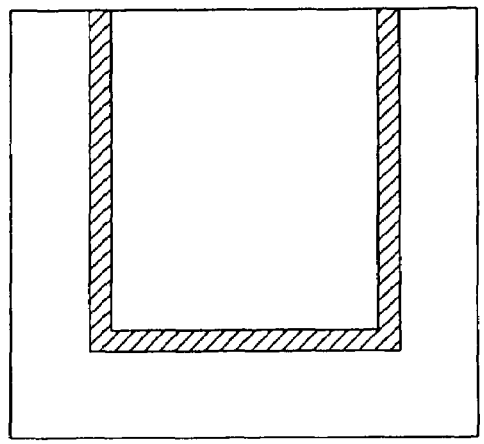

Accordingly, by the same method as that described in the first embodiment, the image data of the unprocessed image is coordinate-converted to generate a bird's-eye view image without distortion, like that shown in FIG. 11B, and the image data of this bird's-eye view image is stored in the image memory A.

Next, a procedure by which, using the vehicle speed signal and the yaw rate signal, the bird's-eye view image stored in the image memory A is moved (for example turned) in correspondence with the amount by which the vehicle has moved (movement amount) will be explained. Here, in FIG. 12 the position of the vehicle at a time T is shown, and a distance through which the vehicle moves by a time T+1 is written L and an angle through which the vehicle moves by the time T+1 is written θ1 (=turn angle θC at turning center).

First, when the sampling time of the camera 21 is 100 [ms], using the vehicle speed S [km/h] obtained from the vehicle speed signal, the distance L [m] through which the vehicle has moved can be calculated from the following formula (2).

$$L[m]=S[km/h]\times 1000[m/km]\div 3600[S/h]\times 100[ms] \div 1000[ms/s] \quad (2)$$

Figure 12:
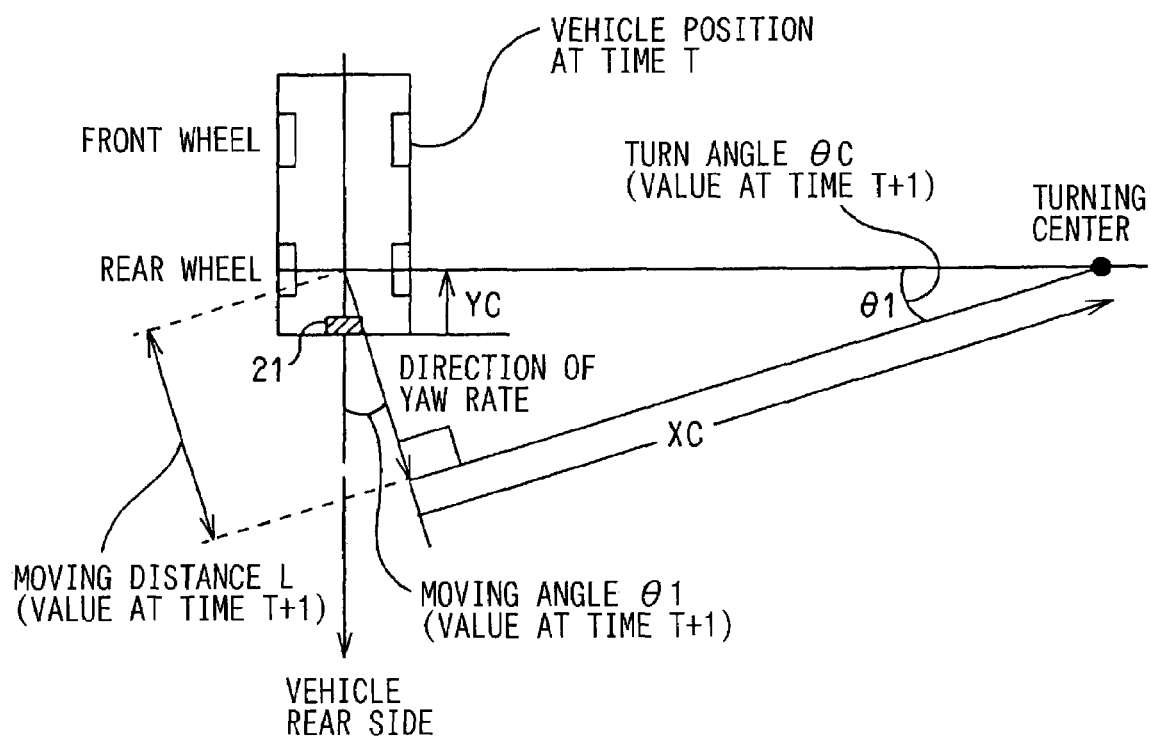
FIG. 12 is a view illustrating positional relationship in a coordinate conversion carried out by the vehicle vicinity image-processing apparatus of the third embodiment.

And, because there is the relationship of the figure shown in FIG. 12, using the yaw rate θ0 [°/s] obtained from the yaw rate signal, the angle through which the vehicle has moved can be calculated from the following formula (3).

$$\theta 1[°]=\theta 0[°/s]\times 100 \ [ms]\div 1000[ms/s] \quad (3)$$

Also, here, because it is being assumed that the turning center of the vehicle is on the extension line of the rear axle, if the forward direction of the vehicle is written Y and the direction perpendicular to this is written X, computing with the camera position as the X-direction origin, the turning center position XC [m] in the X-direction can be calculated from the following formula (4).

$$XC[m]=L[m] \div TAN(\theta 1) \qquad (4)$$

On the other hand, the turning center position in the Y-direction is at the rear axle, and the distance from the camera 21 to the rear axle is YC [cm]. And, from the relationship of the figure shown in FIG. 12, the turn angle θC at the turning center is the same as the angle θ1 through which the vehicle has moved.

Next, using the turning center position (XC, YC) and turn angle θC obtained as explained above, the bird's-eye view image is moved as follows.

The image data of the bird's-eye view image stored in the image memory A is also stored once in the image memory B. Accordingly, here, the image data of the bird's-eye view image stored in the image memory B is transferred to internal memory of the CPU 37, and the bird's-eye view image is turned using the turning center position (XC, YC) and the turn angle θC.

A conversion formula for carrying out this turning movement is shown below as formula (5), and by internal processing of the CPU 37 using this formula, with respect to post-movement coordinates (XB, YB) pertaining to after the move through the turn angle θ, corresponding pre-movement points (XA, YA) are calculated, and (XA, YA) pixel values are saved in the (XB, YB) address memory.

$$XA = XB \cdot COS\ \theta + YB \cdot SIN\ \theta$$

$$YA = YB \cdot COS\ \theta - XB \cdot SIN\ \theta \qquad (5)$$

... where (XA, YA) are pre-movement coordinates; (XB, YB) are post-movement coordinates; and θ is the turn angle.

Then, by performing these calculations for all the coordinates, from the bird's-eye view image stored in the image memory A (the first bird's-eye view image, at the time T), a moved bird's-eye view image (moved bird's-eye view image at the time T) is created. And along with this, the bird's-eye view image created on the basis of the image newly picked up by the camera 21, that is, the present bird's-eye view image (the second bird's-eye view image, at the time T+1) is newly transferred from the image memory A to the CPU 37.

And accordingly, in the CPU 37, the second bird's-eye view image is written to a position where the positional relationship corresponds with the time T (a position where there is no image misalignment with the moved bird's-eye view image), and by this processing the moved bird's-eye view image and the second bird's-eye view image are combined to create image data of a composite bird's-eye view image and this image data is stored in the image memory B.

In the creation of the composite bird's-eye view image, although an image of the position of the vehicle and the field of vision angle of the camera 21 may be added and stored in the image memory B and this composite bird's-eye view image displayed on the screen of the monitor 23, alternatively, instead of an image of the position of the vehicle and the field of vision angle of the camera 21 being stored in the image memory B, an image showing the position of the vehicle and the field of vision angle of the camera 21 may be added when the composite bird's-eye view image stored in the image memory B is drawn to the monitor 23.

Next, processing carried out by the image-processing unit 29 will be described, on the basis of the flow chart of FIG. 13.

Figure 13:
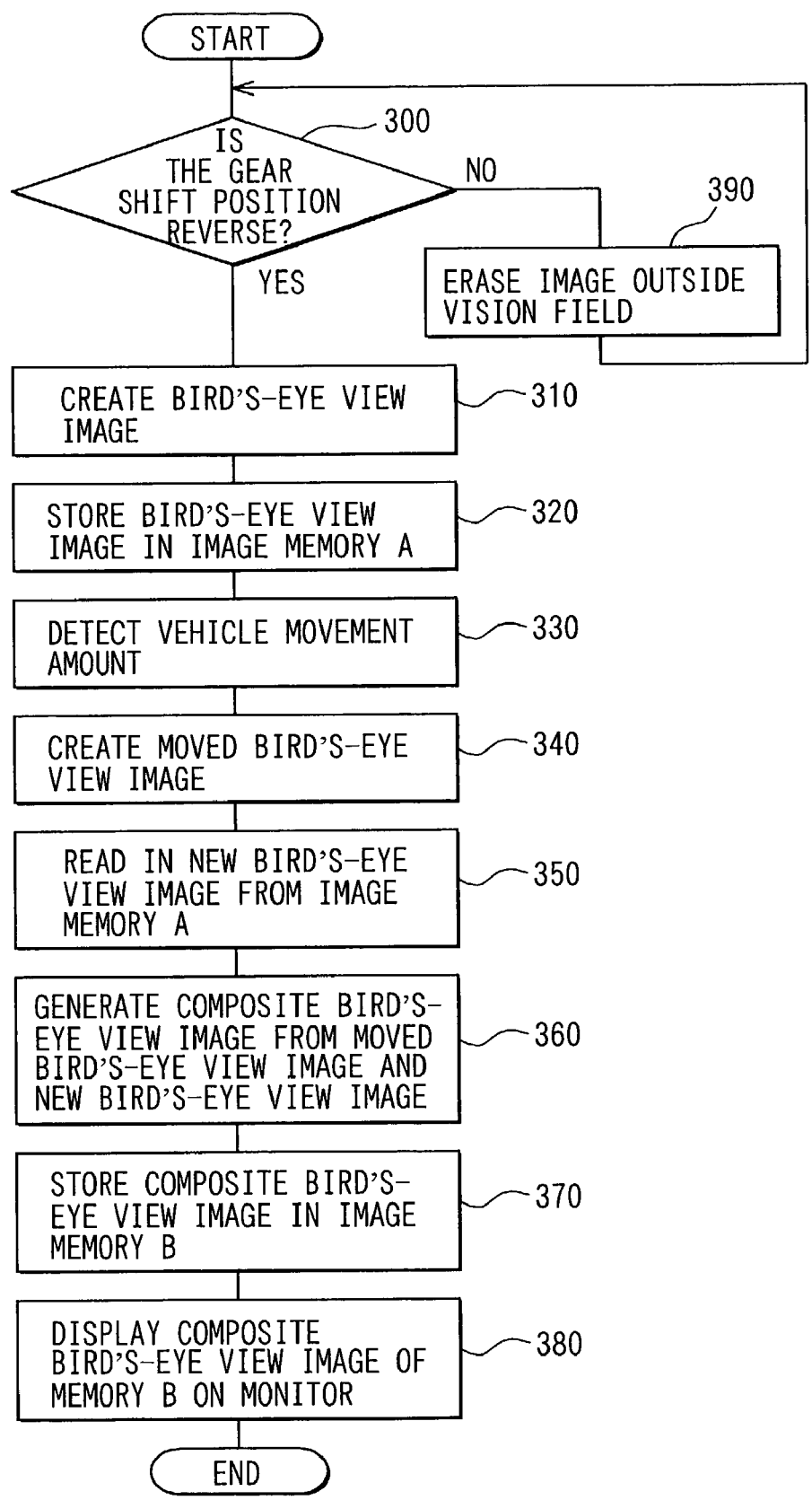
FIG. 13 is a flow chart of processing carried out by the vehicle vicinity image-processing apparatus of the third embodiment.

As shown in FIG. 13, first, in step 300, it is determined whether or not the gear shift position is Reverse. When an affirmative determination is made here processing proceeds to step 310, and when a negative determination is made processing proceeds to step 390. The shift position can be detected on the basis of a signal from a shift position detection sensor (not shown) or a signal from another electronic control unit.

In step 390, any previously drawn image of an area outside the field of vision of the camera 21 is erased; that is, only the present image from the camera 21 (bird's-eye view image) is displayed; and processing then returns to step 300. In step 310, on the other hand, coordinate conversion (bird's-eye view conversion) of the image picked up by the camera 21 is carried out, and a bird's-eye view image is created.

In step 320, this bird's-eye view image is stored in the image memory A. At this time, the same bird's-eye view image is also stored in the image memory B. In step 330, on the basis of the vehicle speed signal and the yaw rate signal, an amount of movement of the vehicle (movement amount), expressed by a movement distance L and a turn angle θC, is obtained.

In the following step, step 340, on the basis of the amount of movement of the vehicle, the bird's-eye view image stored in the image memory B (first bird's-eye view image, at the time T) is moved, and a post-movement bird's-eye view image (moved bird's-eye view image from the time T) is obtained.

Figure 14:
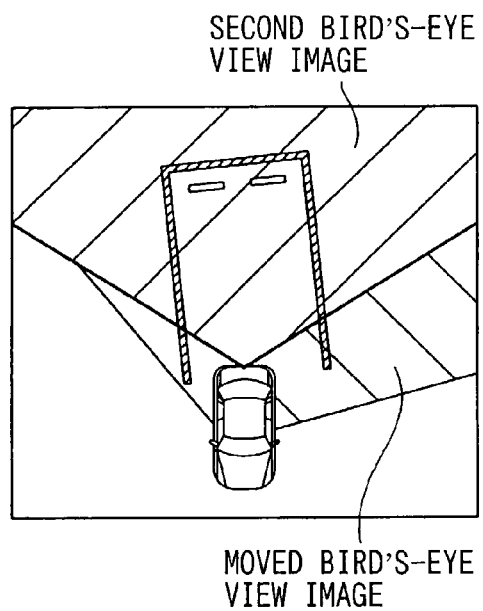
FIG. 14 is a view illustrating an image composition procedure carried out by the vehicle vicinity image-processing apparatus of the third embodiment.

In step 350, a second bird's-eye view image (at the time T+1), newly picked up and stored in the image memory A, is read in from the image memory A. And in step 360, the moved bird's-eye view image and the second bird's-eye view image are combined to generate a composite bird's-eye view image. Specifically, as shown in FIG. 14, the composite bird's-eye view image is composed by writing to outside the new field of vision of the camera (corresponding to the second bird's-eye view image) a part having left the field of vision of the camera due to the latest movement of the vehicle; that is, a part of the moved bird's-eye view image made by moving the first bird's-eye view image in correspondence with the amount of movement of the vehicle (specifically, the part which is left after a part overlapping with the second bird's-eye view image is removed). In FIG. 14, the vehicle is shown for reference; in practice, a frame or the like showing the vehicle is drawn when the composite bird's-eye view image is drawn on a screen of the monitor.

In the following step 370, the composite bird's-eye view image is stored in the image memory B. In step 380, an image showing the vehicle and an image showing the field of vision angle are added; the composite bird's-eye view image stored in the image memory B is displayed on the monitor 23; and the present processing routine ends.

In this way, in this embodiment, the image picked up by the camera 21 is converted into a bird's-eye view image; an amount by which the vehicle has moved is detected on the basis of vehicle signals; and in correspondence with this vehicle movement amount the bird's-eye view image is moved to create a moved bird's-eye view image. Then, the moved bird's-eye view image and a newly read-in bird's-eye view image are combined to compose a composite bird's-eye view image; images of the vehicle and the field of vision angle are added; and this composite bird's-eye view image is displayed on the screen of the monitor 23.

Figure 15A:
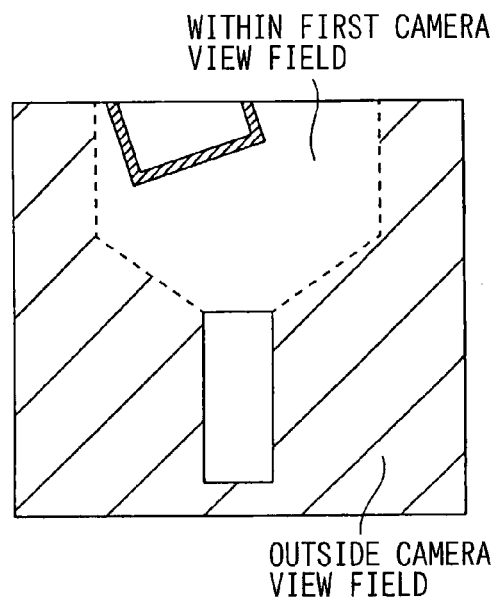
FIGS. 15A through 15C are views showing images displayed on a monitor by the vehicle vicinity image-processing apparatus of the third embodiment.
Figure 15B:
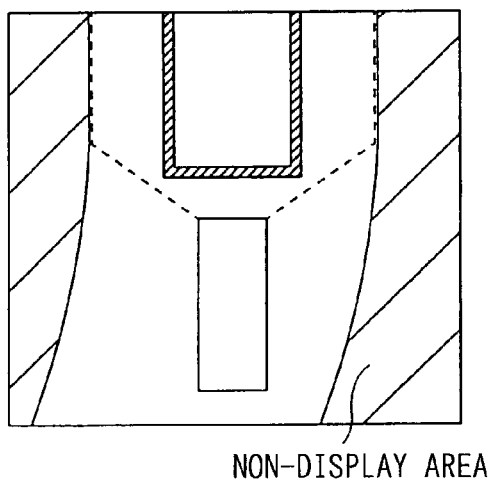
Figure 15C:
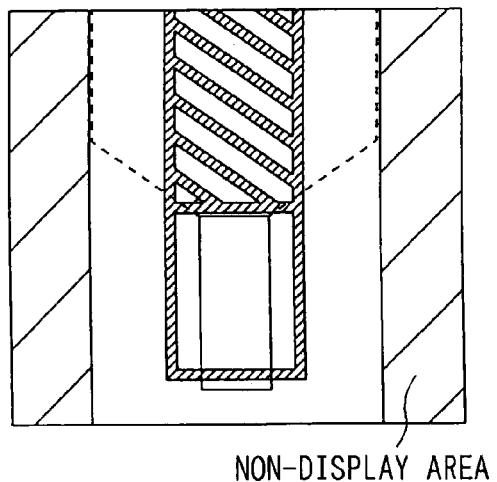

That is, in this embodiment, when the vehicle moves, by deducing an area having left the camera view and combining it with the present camera view, it is possible to display parts which are outside the field of vision of the camera and ordinarily could not be displayed; and consequently, as shown in FIGS. 15A, 15B and 15C, it is possible to understand the positional relationship between the vehicle and the parking space clearly. As a result, there is the marked benefit that maneuvering such as reversing into a parking space becomes extremely easy.

In FIGS. 15A, 15B and 15C, display pictures of the monitor 23 produced by the method of this embodiment are shown in order, when a vehicle first turns and then moves straight while backing into a parking space are shown in order.

In particular, in this embodiment, because the moved bird's-eye view image is created using vehicle signals obtained from a vehicle speed sensor 25 and a yaw rate sensor 27, rather than being created for example by calculating a movement of the vehicle from change of image with time between first and second bird's-eye view images, there is the merit that the computational processing for this is easy. That is, because image-processing such as matching of images, which necessitates a large amount of computation, can be dispensed with, the processing load is lightened and the necessary image can be displayed on the monitor 23 swiftly.

Consequently, the load on the microcomputer and so on is lightened, and the processing speed of the apparatus as a whole can be increased. Because the processing can be carried out by a microcomputer with a lower processing capacity, a contribution to cost reduction is also made.

The present invention is not limited to the embodiments described above, and various changes can of course be made without deviating from the scope of the invention.

(1) For example, in the first embodiment, preferably, the picked-up image of the parking space marking and the car stoppers and so on is not just simply coordinate-converted and displayed, but rather an image of the parking space marking and the car stoppers, which serve as guides for maneuvering the vehicle, is extracted from the image picked up by the camera, and the parking space marking and the car stoppers in the image are strengthened in color and/or tone.

(2) And, in the third embodiment, although in the above-mentioned processing was started when it was detected that the shift position was Reverse, alternatively, so that processing is carried out also when the vehicle has switched to moving forwards after a reversing movement, starting and continuing of processing may alternatively be decided on the basis of a vehicle signal. For example, processing may be started when the vehicle speed is 10 km/h, and processing executed to display a bird's-eye view image for as long as the vehicle speed remains below this speed. By this means it is possible to display a bird's-eye view image continuously, without being reset, even if the shift position changes in the course of a parking operation.

(3) Also, as another application of the invention, by means of a camera viewing an area in front of a vehicle, it is also possible to display a composite bird's-eye view image of the proximity of the vehicle body including the area having left the field of vision of the camera from in front of the vehicle, and thereby provide information by which it can be judged whether or not it is possible to squeeze through a narrow street or the like.

(4) And, whereas in the first, second and third embodiments a vehicle vicinity image-processing apparatus was discussed, the invention also provides a recording medium on which is recorded means for executing the processing of such an apparatus. This recording medium may be any of various recording media, and may for example be an electronic control unit constructed as a microcomputer; a microchip; a floppy disk; a hard disk; and an optical disk. That is, it maybe any recording medium on which is recorded means, such as for example a program, capable of executing the processing of a vehicle vicinity image-processing apparatus described above.

INDUSTRIAL APPLICABILITY

As described above, a vehicle vicinity image-processing apparatus and a recording medium according to the present invention can draw on a monitor an image of the vicinity of a vehicle including a deduced part having left the field of vision of a camera, and accordingly they are highly suitable for use for example in equipment for assisting driving operation such as parking.

What is claimed is:

1. A vehicle vicinity image processing apparatus which is applied to a vehicle having image pick-up means for picking up an image of a vehicle vicinity and display means for displaying an image, and which processes the image picked up by said image pick-up means and displays the processed image on said display means the vehicle vicinity image-processing apparatus comprising:
   bird's eye view image creation means for creating a bird's eye view image on the basis of the image picked up by said image pick-up means;
   vehicle movement amount detecting means for detecting an amount of vehicle movement on the basis of vehicle signals obtained from the vehicle;
   bird's-eye view image moving means for moving a first bird's-eye view image created by said bird's-eye image creation means in correspondence with the amount of vehicle movement and thereby creating a moved bird's-eye view image;
   composite bird's-eye view image creation means for creating a composite bird's-eye view image to be displayed on said display means by combining a second bird's-eye view image which is picked up and created later than the first bird's-eye view image with the moved bird's-eye view image,
   wherein said composite bird's-eye view image is an image in which a part of the moved bird's-eye view image that does not overlap with the second bird's-eye view image is added to a display area of the second bird's-eye view image.

2. A vehicle vicinity image-processing apparatus according to claim 1, wherein said vehicle signals include a vehicle speed signal and a yaw rate signal.

3. A vehicle vicinity image-processing apparatus according to claim 1, wherein the second bird's-eye view image used in creating the composite bird's eye view image includes a latest bird's-eye image.

4. A vehicle vicinity image-processing apparatus according to claim 1, further comprising:
   a first memory for storing the bird's-eye view image created by said bird's-eye view image creation means; and
   a second memory for storing the composite bird's-eye view image created by said composite bird's-eye view image creation means.

5. A vehicle vicinity image-processing apparatus according to claim 4, wherein the composite bird's-eye view image stored in said second memory is displayed on said display means.

6. A vehicle vicinity image-processing apparatus according to claim 1, wherein an image showing the vehicle is added to the composite bird's-eye view image when the composite bird's-eye view image is displayed on said display means.

7. A vehicle vicinity image-processing apparatus according to claim 1, wherein, after a gear shift position is determined to be Reverse, processing carded out by each of said bird's-eye view image creation means, vehicle movement amount detecting means, bird's-eye view image moving means, and composite bird's-eye view creation means is started.

8. A vehicle vicinity image-processing apparatus according to claim 1, wherein said image pick-up means includes a camera for viewing an area in front of the vehicle.

9. A computer-readable recording medium storing a program for executing a processing of the vehicle vicinity image-processing apparatus of claim 1.

* * * * *